US010195696B2

(12) United States Patent
Weigl (10) Patent No.: US 10,195,696 B2
(45) Date of Patent: Feb. 5, 2019

(54) METHOD AND APPARATUS FOR INCREASING THE QUALITY OF THE WELD SEAM IN FRICTION STIR WELDING

(71) Applicant: GRENZEBACH MASCHINENBAU GMBH, Asbach-Baeumenheim (DE)

(72) Inventor: Markus Weigl, Donauwoerth (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 120 days.

(21) Appl. No.: 15/126,473

(22) PCT Filed: Mar. 13, 2015

(86) PCT No.: PCT/DE2015/000116
§ 371 (c)(1),
(2) Date: Sep. 15, 2016

(87) PCT Pub. No.: WO2015/144115
PCT Pub. Date: Oct. 1, 2015

(65) Prior Publication Data
US 2017/0080527 A1    Mar. 23, 2017

(30) Foreign Application Priority Data
Mar. 26, 2014  (DE) .................. 10 2014 004 331

(51) Int. Cl.
*B23K 20/12* (2006.01)
*B23K 31/12* (2006.01)

(52) U.S. Cl.
CPC .......... *B23K 31/125* (2013.01); *B23K 20/124* (2013.01); *B23K 20/1245* (2013.01); *B23K 20/1255* (2013.01)

(58) Field of Classification Search
None
See application file for complete search history.

(56) References Cited

U.S. PATENT DOCUMENTS 6,676,004 B1 *   1/2004  Trapp ................. B23K 20/1255
                                                            228/112.1
6,729,526 B2    5/2004  Okamoto et al.
(Continued)

FOREIGN PATENT DOCUMENTS

DE      102004030381           1/2006
DE      202012005397 U1 *      6/2012  ........... B23K 20/123
(Continued)

*Primary Examiner* — Devang R Patel
(74) *Attorney, Agent, or Firm* — Duane Morris LLP; Gregory M. Lefkowitz; Jason M. Nolan (57) ABSTRACT

Apparatus and method for increasing the quality of the weld seam in friction stir welding, with the following features: a) a receiving plate (1) with a drive head (2), the latter having a receiving flange (19) for receiving a holding bell (3) connected by means of a union nut (7) to a welding shoe (4) with a welding pin tip (5), b) the welding shoe (4) has a circular basic shape, on which there is a transverse web running over the cross section and rising at a right angle to said basic shape, said transverse web having a width of approximately ¼ to ⅕ of the diameter of the basic shape and having an arc-shaped shoe sliding surface and shoe smoothing surface (9), c) the welding pin tip (5) has substantially a surface structure in the form of a tapering thread, this thread-like structure not being arranged in a purely circular manner.

11 Claims, 7 Drawing Sheets

(56) References Cited

U.S. PATENT DOCUMENTS

| | | | |
|---|---|---|---|
| 7,455,210 B2 | 11/2008 | Nagao et al. | |
| 7,654,435 B2 | 2/2010 | Kumagai et al. | |
| 7,942,306 B2* | 5/2011 | Burford | B23K 20/1255 228/112.1 |
| 8,998,064 B2* | 4/2015 | Russell | B23K 20/1235 228/112.1 |
| 2008/0149689 A1* | 6/2008 | Maziarz | B23K 20/1255 228/114.5 |
| 2008/0217377 A1 | 9/2008 | Stol et al. | |
| 2013/0075452 A1* | 3/2013 | Burford | B23K 20/1255 228/2.1 |
| 2014/0077668 A1* | 3/2014 | Morgenstern | B23K 20/122 312/223.1 |
| 2015/0102087 A1 | 4/2015 | Foerg et al. | |

FOREIGN PATENT DOCUMENTS

| | | |
|---|---|---|
| DE | 202014000747 | 2/2014 |
| JP | 2014024095 | 2/2014 |
| WO | 2007006669 | 1/2007 |
| WO | 2013182182 | 12/2013 |

* cited by examiner

METHOD AND APPARATUS FOR INCREASING THE QUALITY OF THE WELD SEAM IN FRICTION STIR WELDING

CROSS-REFERENCE TO RELATED APPLICATIONS

This application is a § 371 national stage entry of International Application No. PCT/DE2015/000116, filed Mar. 13, 2015, which claims priority to German Patent Application No. 10 2014 004 331.2 filed Mar. 26, 2014, the entire contents of which are incorporated herein by reference.

A method for online-quality control in friction stir welding, which method is based on the objective of being reliable and simple, is known from DE 10 2004 030 381 B3. In order for this objective to be achieved, it is claimed that a friction stir tool which is being rotationally moved and impinged by pressure is introduced into the material of workpieces to be welded and guided along a connection point of the workpieces to be welded, wherein the pressure impingement, and/or the oscillations of the friction stir tool which arise during the friction stir welding process, on the workpieces to be welded or on other elements which are excited by the welding process are/is measured as a function of time and are/is subsequently converted to frequency amplitude spectra by means of a Fourier transform, and that the determined frequency amplitude spectra are compared with reference values in order to check the produced welded connection in terms of quality.

Furthermore, a friction stir welding tool and a method and an assembly for real-time checking of a friction stir welding process by detecting the acceleration forces and/or oscillations on the tool body are known from WO 2007/006669 A1.

This document is based on the objective of providing a compact and universally employable friction stir welding tool and a method and an assembly for real-time checking of a friction stir welding process, by way of which optimizing the jointing process in a simple and cost-effective manner is successively achieved such that, as a result thereof, a joint seam results without necessary post-processing and corresponds to the quality requirements, and the stress on the friction stir welding system is minimized. This objective is achieved by a friction stir welding tool which is composed of a main tool body and a tool stirring bolt having a shoulder and a pin, said friction stir welding tool as claimed in claim 1 being characterized in that at least one sensor for detecting the acceleration forces which act on the main tool body is integrated in the main tool body.

Furthermore, a friction stir welding tool and a method for producing the same is known from WO 2013/182182 A1. This publication is substantially based on the objective of improving such a tool in terms of the service life thereof. For this purpose, a probe which serves for applying friction heat is intended to comprise a first probe region which is formed from a first material, and a second probe region which is formed from a second material.

A method and a device for improving the quality of the weld seam in friction stir welding are known from DE 10 2012 010 836 B1, the latter emanating from the applicant, the method and the device being based on the objective of increasing the service life of the friction stir tool from approx. 2 hours to 15 hours, and of increasing the quality of the joint seam such that no post-processing at all is required. This is achieved by a device having the following features:

a) a receptacle plate having a drive head and a spindle bearing for receiving a friction welding tip, wherein a helically machined conveying screw which serves for conveying away any non-required material application in the spindle bearing opens into openings which obliquely lead to the outside;

b) the longitudinal axis of the spindle bearing in relation to the vertical is inclined by an angle of 2.8 to 3.2 degrees;

c) the sliding face of the rotating spindle is composed of a planar sliding face and, in particular in order to weld curved seams, of in each case one inherently vaulted sliding face adjoining on two opposite sides, and being inclined at an acute angle toward the sliding face;

d) the friction welding tip has the shape of a truncated cone in which the covering area is raised in the center, and wherein the surface area of the truncated cone is formed by six trapezoidal area pieces, of which three area pieces each lie opposite one another at an angle of 120 degrees, being uniformly distributed on the circumference, and occupy a proportion of more than $\frac{1}{6}$ on the circular circumference.

Upon termination of the welding process the problem arises that the friction welding tip which exits from the mating partners either causes an increased ejection of material or, in the case of a lesser hole depth, causes a longer track of the exit process. In both cases, post-processing which is more or less complex and thus causes costs is required. The strength of the weld seam produced also suffers herein, because the process of plasticizing and of subsequent cooling of the mating partners by way of the more or less abrupt exit of the friction stir tip from the plasticized mass of the mating partners disturbs the entire microstructure of the welded materials, the risk of fissuring being thus increased in the case of heavy stresses on the weld seam.

If post-processing is not carried out, the final hole remains on the component. The final hole herein not only represents a significant visual disadvantage but in the case of seal welding, for example, may lead to leakages. In the case of dynamic stress, the final hole has a high notch factor, potentially leading to the introduction of cracks. A seam which is free of a final hole likewise offers advantages in the case of chemical stress and an impingement of the seam by liquid media (heat exchanger).

The present invention is therefore based on the object of optimizing the welding procedure in friction stir welding in such a manner that the complete avoidance of the so-called final hole (the remaining negative impression of the stir tool) at the end of weld seams is achieved, and the quality of the weld seam is thus increased.

This object is achieved by the device as claimed in claim 1, device for increasing the quality of the weld seam in friction stir welding, the device having the following features:

a) a receptacle plate (1) having a drive head (2), wherein the latter has a receptacle flange (19) for receiving a mounting bell (3) which by means of a union nut (7) is connected to a welding shoe (4) having a welding pin tip (5);

b) the welding shoe (4) has a circular basic shape on which a transverse web (27), running across the cross section and rising orthogonally to this basic shape, is located which has approximately the width of ¼ to ⅕ of the diameter of the basic shape and has an arcuate shoe sliding face (29) and shoe smooth face (9), wherein a small planar face in the form of a notch-type tapering (16) is located on each side of the shoe sliding face (9) in the region of the periphery of the shoe sliding face (9);

c) the welding pin tip (5) has a surface structure which is substantially in the form of a heavily tapered thread, wherein this thread-like structure is not disposed so as to be purely circular but in each thread pitch (28) has three flat spots which are distributed on the circumference, wherein the centers of these flat spots each are mutually placed at an angle of 120 degrees, and wherein the lead of this thread-like structure is 0.5 mm and the flank height (30) varies from 0.25 mm to 0.05 mm.

It is furthermore claimed that each of the notch-type taperings (16) is configured as a step with a height of a plurality of millimeters; that a positive pressure which ensures that contaminations on the tool are largely removed is generated in the mounting bell (3) by means of a pressure-generating device, wherein by means of this system it may be determined also by measuring the counter-pressure prevailing on the tool whether the exit region 8 on the welding shoe 4 is clogged or free;

that the contact pressure of the shoe sliding face (29) and of the shoe smooth face (9) is adjustable, the respective adjustment being measured and displayed; that the result of the welding process is optically monitored;

or by the method as claimed in claim 6, respectively, method for increasing the quality of the weld seam in friction stir welding, the method having the following features:

a) at the beginning of the welding process a welding pin tip (5) in a welding shoe (4), guided as welding tool by the drive head (2) by means of a mounting bell (3), in a pin plunging path (10) plunges into the component (6) to be joined;

b) thereupon the actual welding procedure is performed in a welding path (11) until the planned weld seam has been completely processed, wherein the setting angle (12) of the welding tool in relation to the vertical is maintained up to the end of the welding path (11);

c) in the following pin run-out path (13) the welding tool is again withdrawn from the component (6) to be joined, wherein the setting angle (12) slowly and continuously increases up to the end of the pin run-out path (13) up to the pin spin-out angle (15);

d) in the following pin spin-out path (14) the welding tool is removed from the component (6) to be joined in such a manner that the spin-out angle (15) in relation to the vertical, which exists at the beginning of the spin-out path (14), increases further, the welding tool continuously moving away from the component (6) to be joined, without forming a hole. That a positive pressure which ensures that contaminations on the tool are largely removed is generated in the mounting bell (3) by means of a pressure-generating device, wherein by means of this system it may be determined also by measuring the counter-pressure prevailing on the tool whether the exit region (8) on the welding shoe (4) is clogged or free;

that the contact pressure of the shoe sliding face (29) and of the shoe smooth face (9) is adjustable, the respective adjustment being measured, regulated, and displayed; and a computer program having a program code for carrying out the method steps as claimed in one of claims 6 to 8, if and when the program is executed in a computer; and a machine-readable carrier having the program code of a computer program for carrying out the method, if and when the program is executed in a computer.

The device according to the invention will be described in more detail hereunder. In the figures and in detail.

Figure 1:
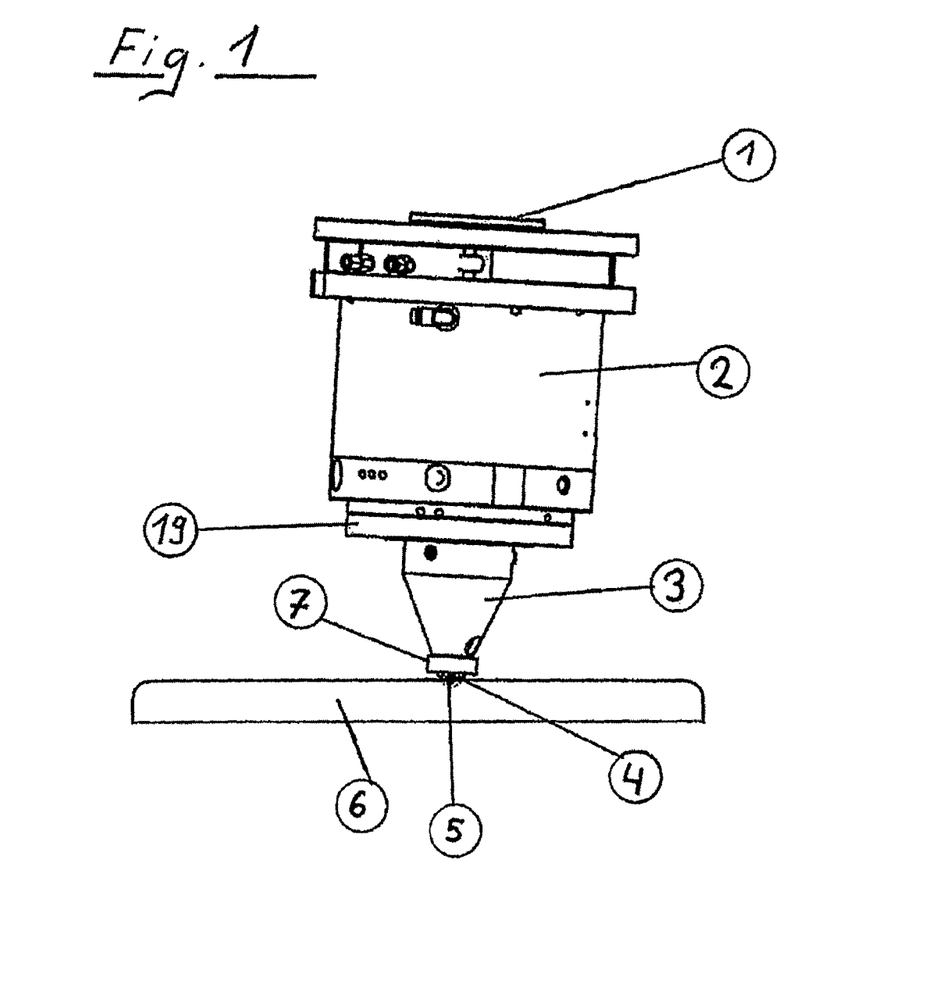
FIG. 1 shows a side view of an assembly for friction stir welding.

FIG. 1 shows a side view of an assembly for friction stir welding. A receptacle plate 1 which may be guided by a robotic arm carries a drive head 2 having a mounting bell 3 which by means of a receptacle flange 19 is fastened to the drive head 2. The mounting bell 3 serves for receiving a welding shoe 4 having a pin mounting for a welding pin, wherein the welding shoe 4 by means of a union nut 7 is fastened to the mounting bell 3 and is secured against being inadvertently twisted. The component 6 to be joined is processed by a welding pin tip 5.

Figure 2:
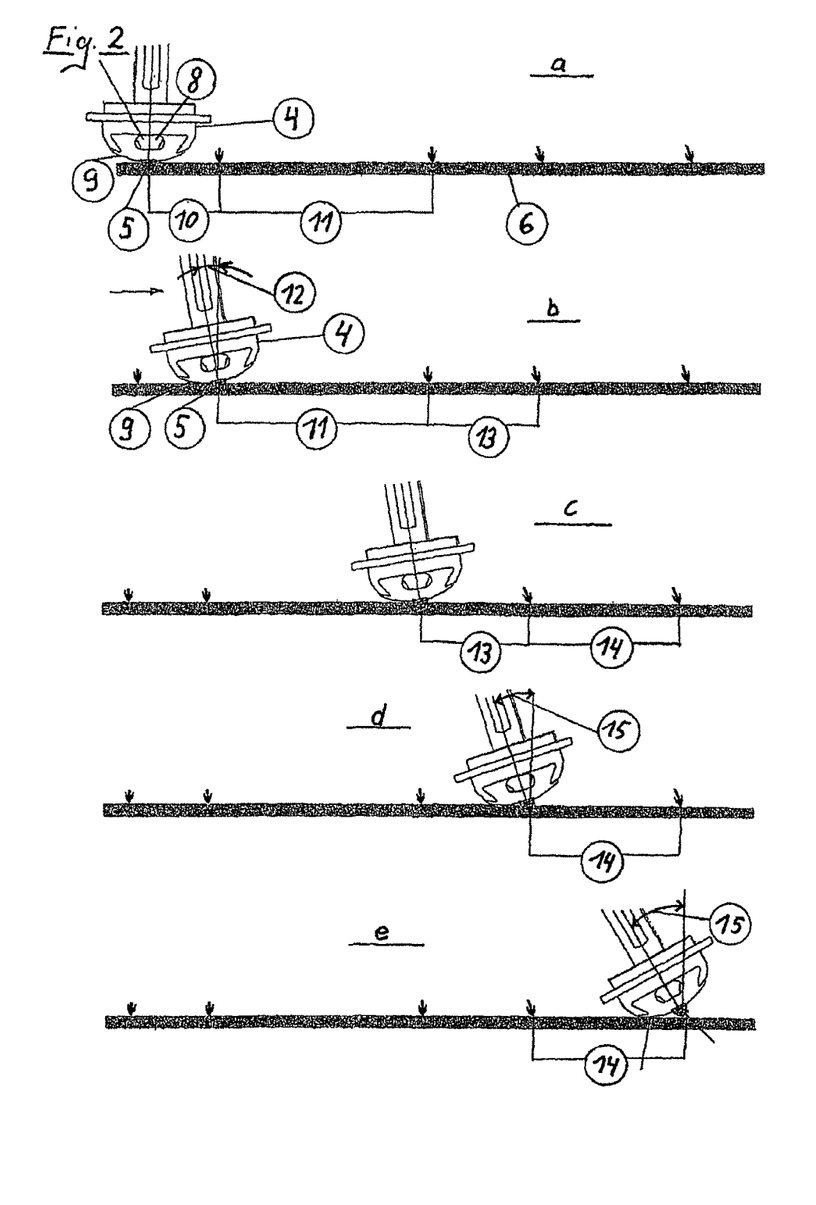
FIG. 2 shows a series of illustrations of the welding procedure.

FIG. 2 shows a series of illustrations of the welding procedure. The welding shoe 4 shown herein is shown in five different positions a) to e) during the welding procedure, so as to correspond to the progress of the process. A pin plunging path 10, in which a welding pin tip 5 plunges into the component 6 to be joined, commences in the position 2a). The plunging path 10 may also be omitted, that is to say that the entire plunging procedure is performed at a specific point. The welding pin tip 5 typically penetrates so as to be perpendicular to the upper side of the workpiece, and is then adjusted to the setting angle 12. The pin plunging path 10 is followed by the actual welding path 11. The shoe sliding face 29 and the shoe smooth face 9 and the exit region for welding material 8 are particularly identified here. The welding shoe 4 is located at the beginning of the welding path 11 in the position 2b), wherein the welding shoe 4 plunges into the component 6 to be joined at a setting angle 12, the latter being in relation to the vertical for the entire welding tool.

The reference signs 5 and 9 are known from the position 2a. The welding path 11 is followed by a pin run-out path 13.

The welding shoe 4 is shown at the beginning of the pin run-out path 13 in the position 2c), said pin run-out path 13 being followed by a pin spin-out path 14.

It can be derived from the position 2d) that the welding shoe at the beginning of the pin spin-out path 14 has a pin spin-out angle 15 (measured in relation to the vertical) which slightly increases up to the end of the pin spin-out path 14, wherein the welding shoe at the end of the spin-out path 14 moves farther, while the pin spin-out angle 15 steadily increases, and compresses plasticized material and is then lifted from the component 6 to be joined. This condition is shown in the position 2e). It is important herein that the welding shoe travels across all regions of the weld seam that have previously been stirred by the welding pin tip 5. This corresponds to a "cold compression" of the spin-out path.

Figure 3:
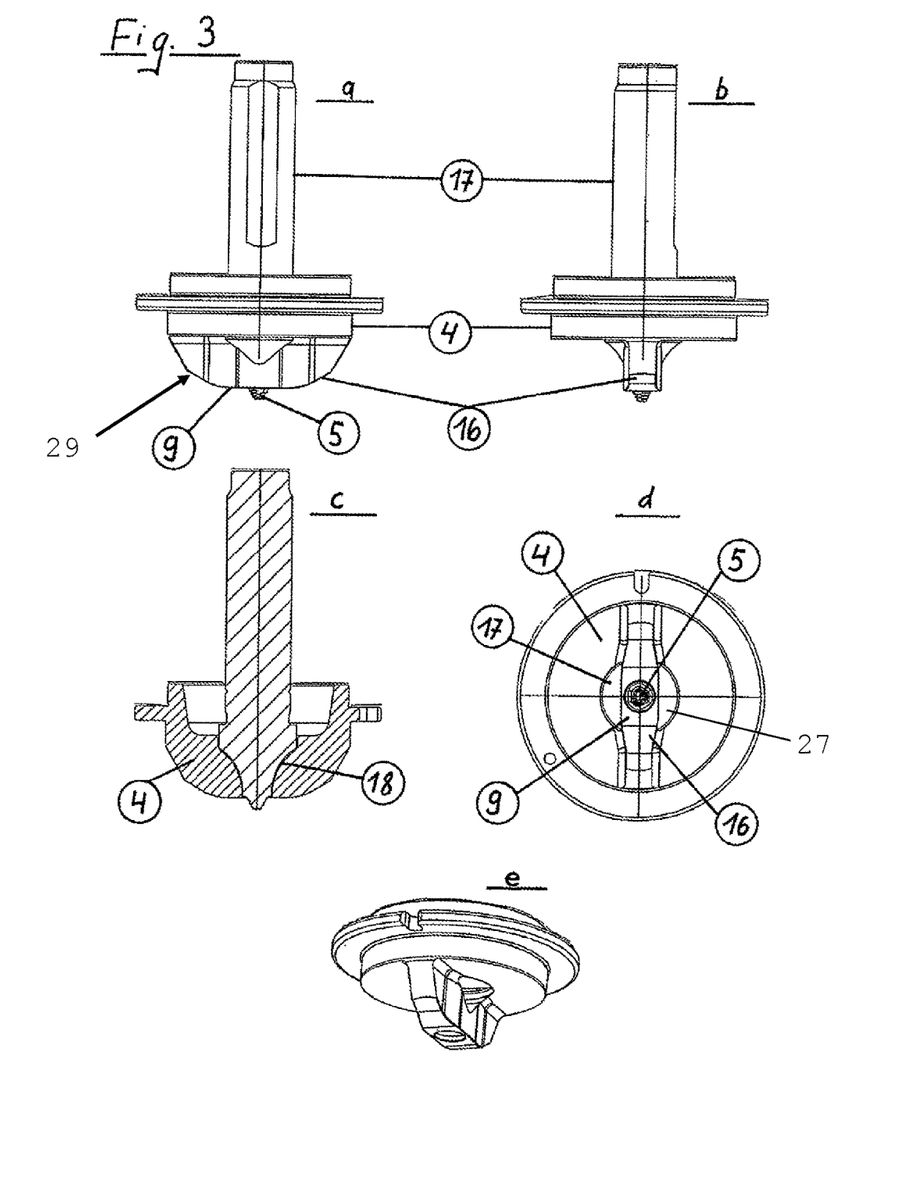
FIG. 3 shows the illustration of a preferred welding shoe.

FIG. 3 shows the illustration of a preferred welding shoe.

This welding shoe 4 may be seen in FIG. 3a. A notch-type tapering 16 in the shoe sliding face 29 and the shoe smooth face 9 is particularly identified herein on the right side, wherein in this welding shoe 4 in this view can be seen from the broad side thereof. The notch-type tapering 16 on both sides of the welding shoe 4 leads to an aerodynamic or bow-like shape, on account of which the welding shoe 4 becomes less sensitive to being oriented in a sub-optimal manner toward the so-called welding impact and may thus be more readily guided around radii which are to be welded. In this context, this may be referred to as self-centering of the welding shoe 4.

The same welding shoe is illustrated in FIG. 3b, rotated by 90 degrees and viewed from the narrow side thereof, wherein the notch-type tapering 16 which has been shown in FIG. 3a can be seen from the front in this view.

FIG. 3c shows the welding shoe 4 of FIG. 3a in section. The pin mounting 18 may be seen here in particular, the cross-sectional profile of said pin mounting 18 following an approximately "trumpet-shaped" curve. The tolerance in the pin mounting 18, between the pin shaft 17 and the welding shoe 4, is approximately 100 μm.

FIG. 3d shows this special welding shoe 4 as viewed from below. Herein, the shoe sliding face 29 and the shoe smooth face 9, together with a referenced notch-type tapering 16 and the pin shaft 17, are particularly identified. The welding pin tip 5 can be seen as being central, in the center of the welding shoe 4. The welding shoe 4 shown here has a substantially circular basic shape on which a transverse web 27 rises, running across the cross section and rising orthogonally, and extends across a width of approximately ¼ to ⅕ of the diameter, having an arcuate delimitation face which functions as the shoe sliding face 29 and the shoe smooth face 9, and having a contour of the type of a bell-crank lever or of a rolling curve. A small planar face, which in each case acts like a notch-type tapering in the shoe sliding face 29 and the shoe smooth face 9, is respectively located on each side of this arcuate delimitation face, in the region of the periphery to the circular basic shape. FIG. 3e imparts a spatial illustration of the described welding shoe 4.

Figure 4:
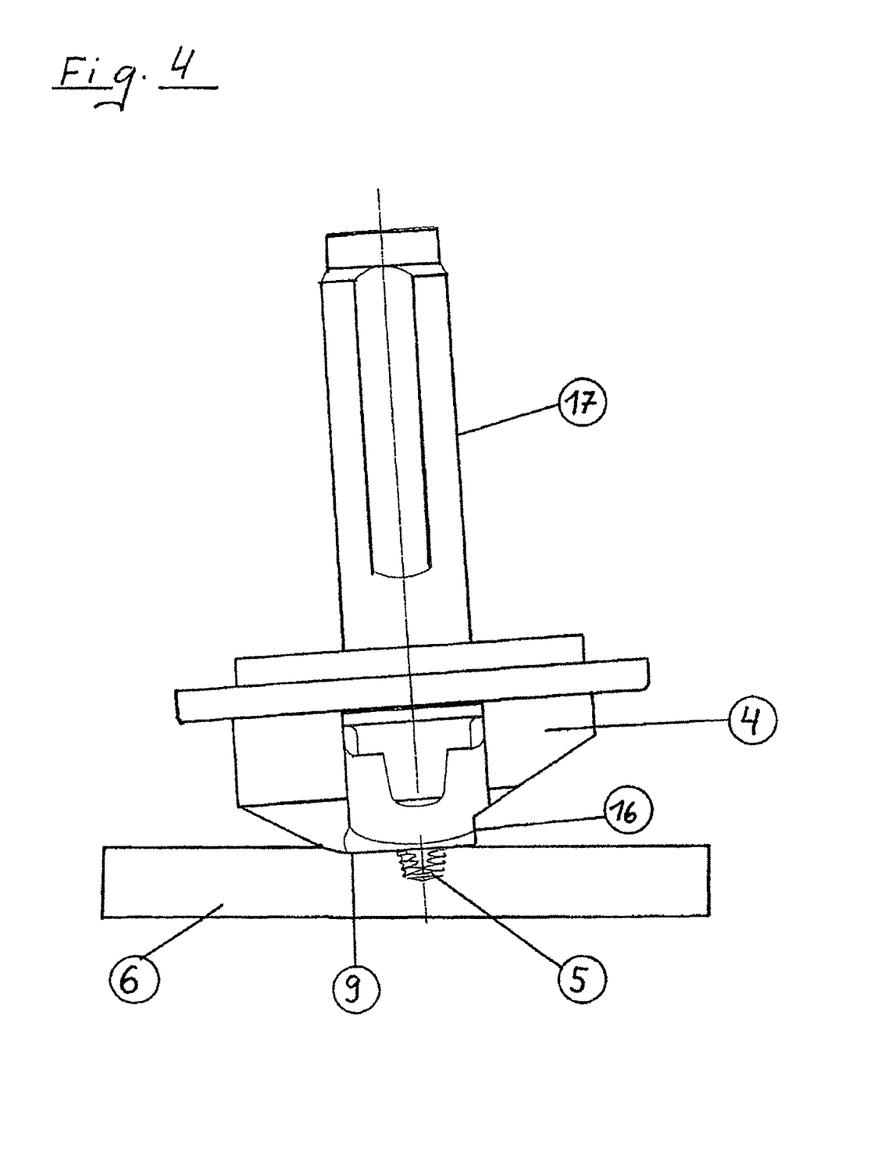
FIG. 4 shows an illustration of a particular construction mode of the welding shoe as above.

FIG. 4 shows an illustration of a particular construction mode of the welding shoe as above. This welding shoe 4 here is shown having the welding pin tip 5 thereof and the pin shaft 17 thereof, when processing a component 6 to be joined. Herein, the shoe sliding face 29 and the shoe smooth face 9 are characterized in that the notch-type tapering 16 is configured as a step with a height of a plurality of millimeters. In this sense, this here is a so-called "relief groove" which significantly reduces any compression and compacting of the component to be joined when the latter impacts the welding shoe 4. Moreover, better free-running properties result, that is to say that excess material is more readily conveyed away. This is expressed in an improved configuration of the seam surface of the welded joints and in reduced "clogging" of the welding shoe 4. In the illustration shown, the entire welding shoe 4 is heavily highlighted as being engaged in the component 6 to be joined.

Figure 5:
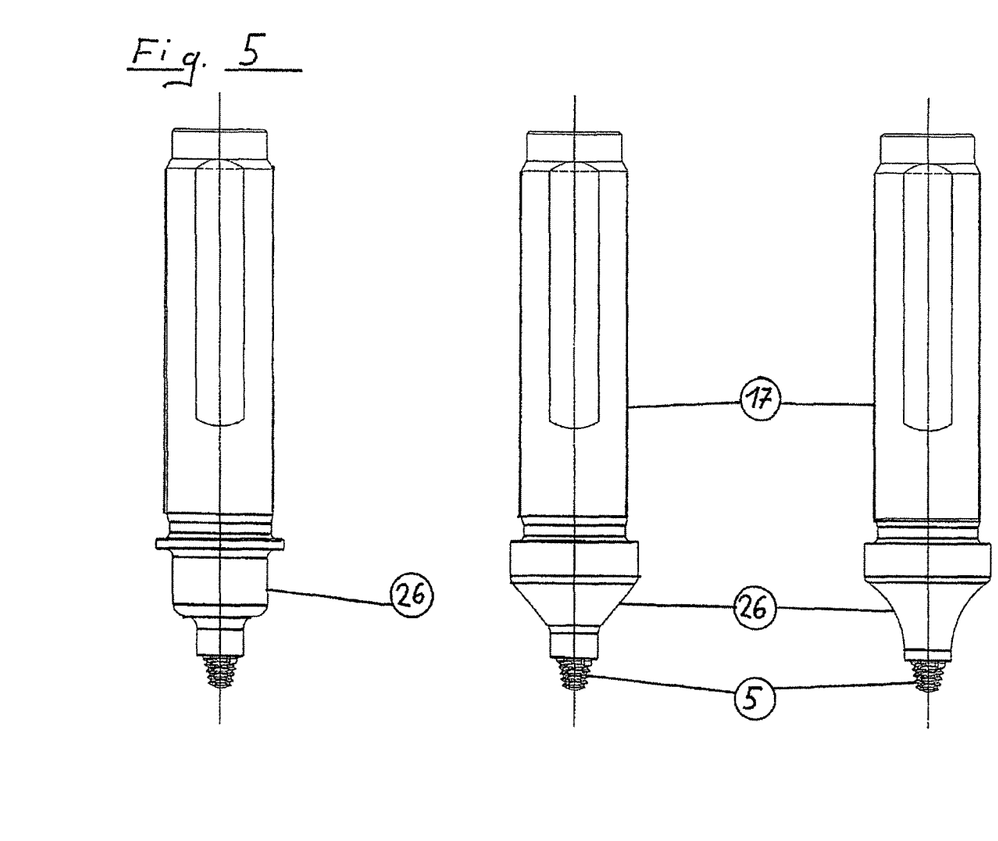
FIG. 5 shows an illustration of a sealing pack.

FIG. 5 shows an illustration of three design embodiments of a sealing pack. In this context, reference is not made to a mounting since, apart from adequate guiding, defined sealing in relation to the welding process must also be guaranteed. It is preferable herein that the pin neck 26 in the cross section thereof has the shape of the end piece of a trumpet, as is shown on the right of the figure.

Figure 6:
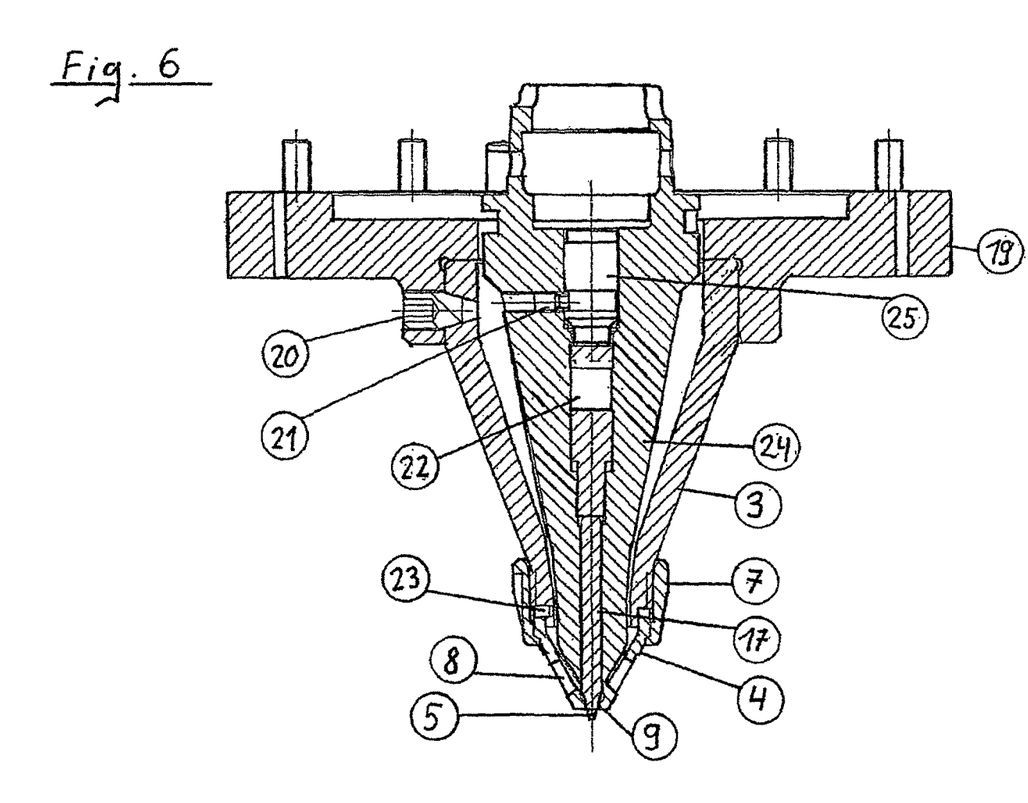
FIG. 6 shows the illustration of the entire mounting of a welding pin tip 5.

FIG. 6 shows the illustration of the entire mounting of a welding pin tip 5. As a base, the receptacle flange 19 for the mounting bell 3 can be seen here, wherein a mounting screw 20 having a conus serves for mounting the mounting bell 3 on the receptacle flange 19. A welding pin mounting conus 24 which encloses a pin shaft 17 which by way of an adjustment element 22 is connected to a welding pin counter-bearing 25 is mounted so as to be central in the mounting bell 3. The welding pin counter-bearing 25 is secured by means of a mounting screw 21. A rough adjustment of the effective length of the welding pin tip 5 may be performed by way of the welding pin counter-bearing 25, wherein said rough adjustment may be performed by means of a respective fine pitch thread (not referenced in more detail). A fine adjustment of the effective length of the welding pin tip 5 may be performed by means of a piezo element (likewise not referenced in more detail) which is electronically variable in terms of length.

Herein, 9 again references the shoe smooth face 9 of the welding shoe 4, wherein the welding shoe 4 by means of a lock 23 is secured against being twisted and by means of a union nut 7 is fastened to the mounting bell 3. The exit region 8 for the welding material of the welding shoe 4 is likewise visible here. It is preferably provided here by way of the visible gap which exists on either side between the welding pin mounting conus 24 and the mounting bell 3, that a positive pressure which ensures that contaminations on the tool are largely removed is generated by means of a pressure-generating device (not referenced in more detail here). This procedure may also be facilitated by adding a cleaning liquid based on nano technology. By way of this system it may also be determined by measuring the counter-pressure prevailing on the tool whether the exit region on the welding shoe 4 is clogged or free. It is furthermore preferably provided that a respective cleaning cycle using ionized air and/or suitable cleaning liquids is carried out at specific intervals.

Furthermore, it is provided by means of a device (not referenced in more detail) that excess material which is created during the welding process is likewise suctioned off.

Figure 7:
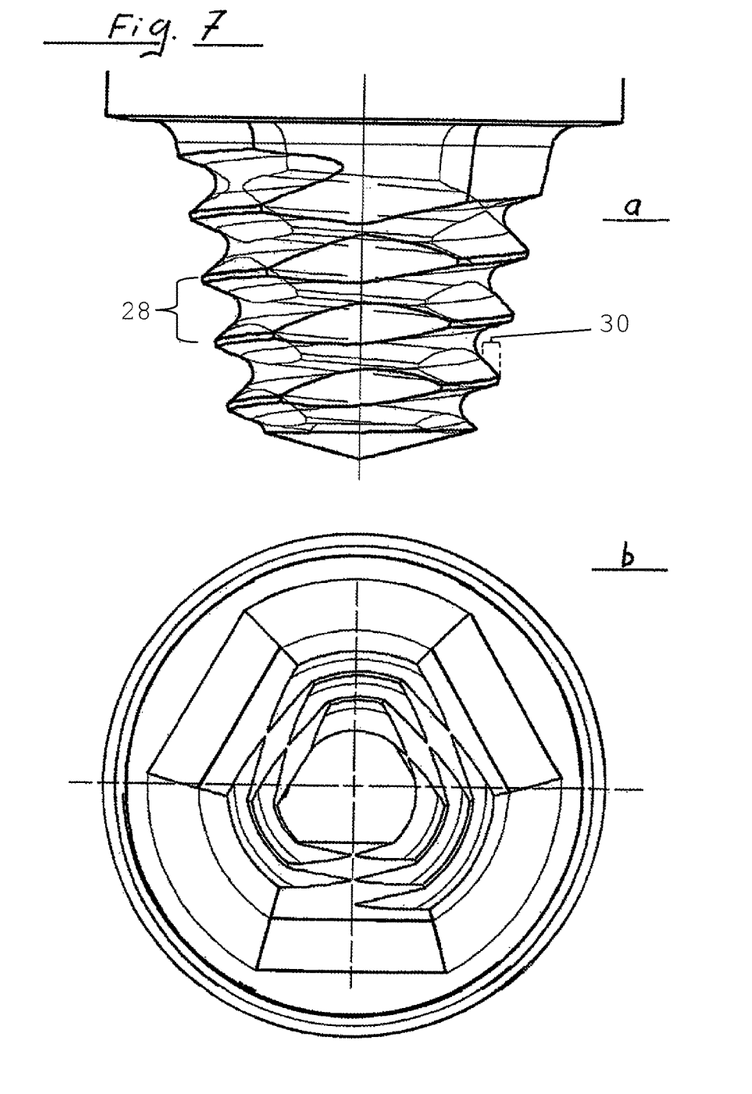
FIG. 7 shows a particular shape of a welding pin tip 5.

FIG. 7 shows a particular shape of a welding pin tip 5.

An enlarged side view of a preferred construction mode of a welding pin tip can be seen herein in FIG. 7a. This construction mode has a surface structure which is substantially in the form of a heavily tapered thread. However, this thread-like structure is not disposed so as to be purely circular, but in each thread pitch (28) has flat spots which are distributed on the circumference, wherein the centers of these flat spots are mutually placed at an angle of 120 degrees, as is shown in FIG. 7b. The lead of this thread-like structure is 0.5 mm and the flank height (30) varies from 0.25 mm to 0.05 mm.

The tool parts that are in engagement preferably have a coating with ZrCrN or CrN.

The complex controller of the motion sequences described requires a special control program.

LIST OF REFERENCE SIGNS

1 Receptacle plate (robotic arm)
2 Drive head
3 Mounting bell for the tool
4 Welding shoe
5 Welding pin tip
6 Component to be joined
7 Union nut as mounting for a welding shoe
8 Exit region for welding material
9 Shoe smooth face
10 Pin plunging path
11 Welding path (seam)
12 Setting angle of the welding tool
13 Pin run-out path
14 Pin spin-out path (increase in angle of setting angle)
15 Pin spin-out angle
16 Notch-type tapering of the shoe smooth face
17 Pin shaft 18 Sealing pack in the welding shoe
19 Receptacle flange for the mounting bell 3
20 Mounting screw having a cone for the mounting bell 3
21 Mounting screw for the pin stop
22 Adjustment element for the pin length
23 Welding shoe lock preventing twisting
24 Welding pin mounting conus
25 Welding pin counter-bearing
26 Pin neck
27 Transverse web
28 Thread pitch
29 Arcuate shoe sliding face
30 Flank height

The invention claimed is:

1. A device for increasing the quality of the weld seam in friction stir welding, the device comprising:
 a) a receptacle plate (1) having comprising a drive head (2), wherein the drive head comprises a receptacle flange (19) for receiving a mounting bell (3) which by means of a union nut (7) is connected to a welding shoe (4) comprising a welding pin tip (5);
 b) the welding shoe (4) comprising a circular basic shape on which a transverse web, running across the cross section and rising orthogonally to the circular basic shape, is located and has a width of ¼, to ⅕ of the diameter of the basic circular shape and comprises an arcuate shoe sliding face (29): wherein the transverse web further comprises a shoe smooth face (9) and a first small planar face (16) on each side of the shoe smooth face (9) and contacting the shoe smooth face (9);
 c) the welding pin tip (5) comprising a surface structure which is substantially in the form of a heavily tapered thread, wherein the thread-like surface structure is not purely circular but in each thread pitch (28) includes three flat spots which are distributed on the circumference of the thread-like surface structure, wherein the centers of the flat spots each are mutually placed at an angle of 120 degrees, and wherein a lead of this thread-like surface structure is 0.5 mm and a flank height varies from 0.25 mm to 0.05 mm.

2. The device as claimed in claim 1, wherein each of the first small planar faces comprises a height of a plurality of millimeters.

3. The device as claimed in claim 1, that wherein the mounting bell (3) is configured to receive a positive pressure from a pressure-generating device.

4. The device as claimed in claim 1, wherein the shoe sliding face and the shoe smooth face (9) are configured to receive an adjustable contact pressure, and the device is configured to measure and display the respective adjustment.

5. The device as claimed in claim 1, wherein the quality of the weld seam in friction stir welding is monitored optically.

6. A method for increasing the quality of the weld seam in friction stir welding, the method comprising:
 a) providing the device as claimed in claim 1;
 b) plunging the welding pin tip (5) in a pin plunging path (10) of a component (6) to be joined;
 c) welding the component (6) to be joined in a welding path (11) until a planned weld seam has been processed, wherein a setting angle (12) of the device in relation to a vertical is maintained up to the end of the welding path (11);
 d) withdrawing the welding pin tip (5) from the component (6) to be joined following a pin run out path (13), wherein a setting angle (12) slowly and continuously increases up to the end of the pin run-out path (13) up to a pin spin-out angle (15);
 e) removing the device from the component (6) to be joined in a pin spin-out path (14) in such a manner that the spin-out angle (15) in relation to the vertical, which exists at the beginning of the spin-out path (14), increases further, the device continuously moving away from the component (6) to be joined, without forming a hole.

7. The method as claimed in claim 6, wherein a positive pressure is generated in the mounting bell (3) by means of a pressure-generating device.

8. The method as claimed in claim 6, wherein a contact pressure of the shoe sliding face and of the shoe smooth face (9) is adjustable adjusted, and wherein the respective adjustment is measured, regulated, and displayed.

9. The device as claimed in claim 1, wherein the welding shoe (4) further comprises a second small planar face contacting each of the first small planar faces.

10. The device as claimed in claim 3, wherein the device is adapted to measure a counter-pressure on the device to determine whether an exit region (8) on the welding shoe 4 is clogged or free.

11. The method as claimed in claim 7, further comprising measuring a counter-pressure on the device to determine whether an exit region (8) on the welding shoe 4 is clogged or free.

* * * * *